US006976218B2

(12) United States Patent
Stanford-Clark

(10) Patent No.: US 6,976,218 B2
(45) Date of Patent: Dec. 13, 2005

(54) USER INTERFACE DESIGN

(75) Inventor: Andrew James Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/133,080

(22) Filed: Apr. 26, 2002

(65) Prior Publication Data

US 2002/0171677 A1 Nov. 21, 2002

(30) Foreign Application Priority Data

Apr. 27, 2001 (GB) .................................... 0110327

(51) Int. Cl.[7] .............................................. G09G 5/00
(52) U.S. Cl. ...................... 715/744; 715/738; 715/745; 709/229; 709/223
(58) Field of Search ............................... 715/736–748, 715/760, 762, 771; 709/229, 223, 224

(56) References Cited

U.S. PATENT DOCUMENTS

| 5,103,498 | A | * | 4/1992 | Lanier et al. ................. 706/58 |
|---|---|---|---|---|
| 5,802,255 | A | * | 9/1998 | Hughes et al. ................ 706/59 |
| 6,064,381 | A | * | 5/2000 | Harel .......................... 715/705 |
| 6,340,977 | B1 | * | 1/2002 | Lui et al. ..................... 715/709 |
| 6,545,690 | B1 | * | 4/2003 | Hernandez, III ............ 715/762 |
| 6,701,362 | B1 | * | 3/2004 | Subramonian et al. ...... 709/224 |
| 6,763,342 | B1 | * | 7/2004 | Mattern et al. ............... 706/46 |
| 6,763,386 | B2 | * | 7/2004 | Davis et al. ................. 709/224 |
| 6,771,291 | B1 | * | 8/2004 | DiStefano, III ............. 715/762 |
| 2002/0063735 | A1 | * | 5/2002 | Tamir et al. ................. 345/745 |
| 2002/0147652 | A1 | * | 10/2002 | Gheith et al. ................. 705/26 |
| 2002/0161901 | A1 | * | 10/2002 | Weissman ................... 709/229 |
| 2003/0053420 | A1 | * | 3/2003 | Duckett et al. ............. 370/252 |

* cited by examiner

*Primary Examiner*—Tadesse Hailu
(74) *Attorney, Agent, or Firm*—Gregory M. Doudnikoff; Winstead Sechrest & Minick

(57) ABSTRACT

The invention relates to providing to a user a user interface. It is determining from a plurality interactions by a user with a first user interface whether they experienced difficulties using at least one module of the first user interface. Responsive to determining that the user did experience difficulties, that user is provided with at least one module of a different user interface. Thus it can be seen that a user is preferably provided with the first interface unless they experience difficulties with that interface. Other users who do not experience such difficulties continue to interact with the first interface.

41 Claims, 8 Drawing Sheets

FIG. 3

```
<html>
<head>
<title> Bargains Galore </title>
<script language="javascript">
function handleEvent(){
[code]
}
</script>
</head>
<body onmousedown=handleEvent();>
<a href="www.ibm.com/page.html">
<img src="button.gif">
</a> CD Players
</body>
</html>
```

USER INTERFACE DESIGN

FIELD OF INVENTION

The present invention relates to user interface design, and more particularly to user interface design for different categories of user.

BACKGROUND OF THE INVENTION

User interfaces (UI) come in a numerous different forms, some good but many more bad. The look, feel and general usability of a UI is extremely important. A badly designed UI typically leaves a user with a poor lasting impression of the company with which the interface is associated. On the other hand, the more pleasant the experience the more likely a user's interaction's will be converted into positive actions such as continued use and buys.

The design of such interfaces is a difficult and time consuming process. Whilst developers will typically conduct a series of in-house tests prior to the release of their product, these are generally based upon contrived scenarios and are therefore highly artificial. UI designers have the very difficult challenge of catering for a cross-section of users with whom they will, in all likelihood, have had no previous contact.

One particular type of user interface which has come very much to the fore in recent years is the interface for accessing the World Wide Web (or web). The majority of companies conduct at least some of their business via the web. This may, for example, be using an online shop such as that promoted by both Sainsburys' and Tescos', or simply by displaying information about themselves and their wares. The look, feel and general usability of a company's website (site) is therefore also extremely important. A user who has trouble navigating and using a particular site is typically left with a poor lasting impression of the company associated with that site and is unlikely to buy from that company.

A user interface or website might be difficult to use for a number of different reasons. For example selectable elements (e.g. button hyperlinks) may be small. As another example, the hypertext links may be in a colour which is difficult to make out (e.g. yellow) and be positioned next to images with no function other than to make the site look attractive. Certain users may continually click on the picture rather than the link beside it because the visual cues are misleading to those users.

Speed-trap, a performance management company, have gone some way to solving the problem of website design. They market a product known as Prophet which can provide detailed information on a user's interaction with a website, including complete click-stream analysis; mouse trails; analysis of keystrokes etc. According to the disclosure of this product at "www.speed-trap.com", it becomes clear by watching mouse trails when a customer is having difficulty in locating a required item, object or button.

Prophet is therefore an extremely valuable analysis tool which enables companies' to identify problems with a website such that the designers set to work improving a site's design and therefore the user's browsing experience.

However, not all users will experience the same problems with a site.

The two examples provided above are most likely to effect a particular type of user. For example, a user with co-ordination problems will potentially find the accurate location of buttons awkward. For a person with poor eyesight, the colour and size of links and their positioning is likely to be extremely important. A website not taking account of such considerations will typically therefore frustrate certain categories of users. On the other hand, able bodied users or other categories of user should have much less trouble with the navigation and use of the same sites. Prophet treats all users as anonymous and cannot identify users by such categories. As a result it is only able to cope with the all or nothing situation. If a minority of users are experiencing problems, then website designers will ignore these leaving disabled users frustrated.

Cookies provide the ability to recognise users as individuals. Upon visiting a site using cookies, a user is typically asked to submit some personal information about themselves (e.g. via a form). This information is sent to a server hosting the website (web server) and is packaged into a cookie (or text file). This is then downloaded to the user's computer and stored there for future use. The information stored is used when the user returns to the same site in order to provide a more personalised browsing experience. For example, the Sainsburys' site welcomes users by name ("Good morning Miss X").

User's are however aware that they provided this information in the first place. The whole process is not a transparent one. There are some instances when a user will not appreciate being typecast. A user may feel discriminated against by having to inform an anonymous web server that they fit into a particular group of users and should therefore be treated differently to another group of users. One such categorisation is able-bodied versus disabled users. Many disabled users try to live as normal a life as possible and do not appreciate blatantly different treatment or discrimination.

DISCLOSURE OF THE INVENTION

Accordingly, the invention provides a method for providing to a user a user interface, comprising the steps of: determining from a plurality interactions by a user with a first user interface whether they experienced difficulties using at least one component of said first user interface; and responsive to determining that said user did experience difficulties, providing said user with at least one component of a different user interface.

It should be noted that the user may experience difficulties with a large part of the first user interface and therefore be provided with a complete different user interface.

Thus it can be seen that a user is preferably provided with the first interface unless they experience difficulties with that interface. Other users who do not experience such difficulties continue to be interact with the first interface.

In one embodiment, each user interface is a component of at least one web page and it is determined from a plurality of interactions by a user with at least one web page of a first type whether they experienced difficulties using the at least one web page of a first type. If so, the user is serviced with at least one web page of a second type.

In an alternative embodiment, the first user interface is part of an application program and the application program has program code for identifying interaction difficulties; and selectable user interfaces.

In one embodiment, each user is taken through an application set-up process including a number of predefined interactions with different UI elements. The user's interactions are analysed in order to provide that user thereafter with one of the selectable UIs.

In one embodiment, information is stored regarding user interactions with the first user interface. The stored set of previous interactions by the user with the first user interface are analysed. The user interactions are analysed in relation to selectable elements. It is noted when a user has selected a selectable element (a hit) and when a user has selected a non-selectable element or part (a miss). In order to note when a user has selected a selectable and a non-selectable element, information is received regarding the position within said first user interface of each hit and each miss (e.g. x and y coordinates). In one embodiment the selectable elements are hyperlinks and in another embodiment, the selectable elements are radio buttons; check boxes; text input fields. (A user interface may of course consist of a combination of any of the afore-mentioned.) It will be appreciated that these are examples only and that the invention is in no way limited to such.

In a preferred embodiment, a map is stored of the first user-interface and provides comprehensive information regarding the layout of the first user interface. The map includes details of any selectable elements and any non-selectable visual elements. By way of example, visual non-selectable elements may be text and images. (Non-visual non-selectable elements may be, for example, background pixels).

In one embodiment, the map is used to determine which visual non-selectable element was selected relative to a nearby selectable element. Responsive to determining that said visual non-selectable element is repeatedly selected prior to the selection of the nearby selectable element, it is further determined that the positioning of visual non-selectable element is misleading to that user. In other words a user may continually select non-selectable text or images because they are placed too close to a selectable element such as a hyperlink. This information can be used to provide a new user interface to the particular category of user into which that user falls.

In one embodiment a message is received to indicate that a user had previously experienced difficulties using the first user interface. In one embodiment, this is in the form of a cookie.

According to another aspect, the invention provides a method for servicing users with web pages, comprising the steps of: receiving a request from a user for a web page of a first type (A); identifying that said user has had trouble using at least a part of a website with which said first type of web page is associated; and servicing said user with a web page of a second type (B).

It should be noted that the user may experience problems with just a particular page/a few page(s), or with the whole/a large part of the site. Thus a web page of type B may be serviced to the user for each request to the particular page/few pages, or for a request to anywhere within the site respectively.

Preferably a user selection of a hyperlink invokes a web page request and first positional information is received regarding a user selection. Second positional information is also preferably received regarding at least one selection in a web page of a non-selectable element. This first and second positional information is stored at a web server and in one embodiment comprises x and y coordinates. This positional information is associated with a user identifier (or computer identifier) and timestamps relating to the first and second positional information are also stored.

In accordance with the preferred embodiment, the requesting user's second positional information indicating a selection of a non-selectable element by the user in the vicinity of a hyperlink, is correlated with the user's first positional information that resulted in the selection of that hyperlink.

In accordance with the preferred embodiment, the correlated first and second positional information is used to determine whether a user is having trouble using at least a part of the website with which said first type of web page is associated and if so, a note is made of the user's identifier. Preferably this correlation only happens if the timestamps for each are within a predetermined range. This is because a user will typically make a quick succession of interactions with non-selectable elements of the UI (clicks) prior to hitting upon the intended hyperlink.

In accordance with the preferred embodiment, a map of the web page from which the hyperlink is selected is also stored. The map provides comprehensive information regarding the layout of the web page and preferably includes references to any hyperlinks and at least one of non-selectable text, non-selectable images and colours present on the associated page. This is used to determine whether a user's selection constitutes a hit or a miss and if a miss, which link the user was aiming for (i.e. clicked in the vicinity of). This enables more accurate information to be provided.

The map is preferably used to determine which non-selectable element of the mapped web page was selected relative to a hyperlink in the vicinity of said non-selectable element. Responsive to determining that said non-selectable element is repeatedly selected prior to the selection of a hyperlink and that said non-selectable element is at least one of text and an image, it is further determined that the positioning of said text and/or image is misleading to that user.

Preferably at least one of the positional information and the map is used to create at least one new web page for servicing, upon request, users identified as having trouble using the web page of a first type.

It will be appreciated that the positional coordinates may vary between one browser displaying a web page and the next and between one browser and the web server. This is because the coordinates are typically dependent upon the shape and size of the window in which a browser and consequently the web page is displayed. This does not matter however, because it is possible to deduce from the action performed that a link was selected. By correlating the coordinates pertaining to the selection of a selectable element with the coordinates pertaining to the selection of a non-selectable element immediately previous, one can tell which link was being aimed for and where relative to the final valid selection the non-selectable clicks were made.

It should be noted that many different website designs are possible and will typically take into account considerations such as the position and size of hyperlinks including how they are positioned on the HTML page relative to other visual cues, buttons and other hyperlinks. Further the colour and applicability of the links are also preferably important (e.g. a telephone is an intuitively good icon (pointer) for linking to contact information). The web page map preferably includes all such information and is used for this purpose.

Preferably, users are grouped according to the trouble they experience using the website. A user is serviced with a web page according to the group within which that user sits. Two example groups are disabled users versus able bodied users. In one embodiment, the disabled users are further categorised into sub groups. By way of example, a first sub group pertains to those with motor control and co-ordination difficulties and for whom the location and size of hyperlinks is likely to be important. A second sub group exists for those with poor eyesight and for whom the colour and size of links and their positioning is likely to be extremely important.

According to one preferred embodiment, in order to identify users who have had trouble using at least a part of the website with which the first type of web page is associated a list is accessed. It is then determined whether the user requesting the first type of web page is found within that list. The user is only serviced with a web page of the second type if the answer is yes.

In another embodiment a message (e.g. a cookie) is received including an indicator pointing to the list and the indicator within the message is used to reference the list.

In yet another embodiment, a message (e.g. a cookie) is received including an indicator that the requesting user previously had trouble using at least a part of the website with which said first type of web page is associated. Responsive to the indicator being present within the message, the user is serviced with the web page of the second type.

According to another aspect, the invention provides a computer program product comprising computer program code adapted to perform the method described above when said program is run on a computer.

According to yet another aspect, the invention provides a server for providing to a user a user interface, comprising: means for determining from a plurality interactions by a user with a first user interface whether they experienced difficulties using said first user interface; andmeans, responsive to determining that said user did experience difficulties, for providing said user with a different user interface.

In one embodiment the components for analysing a user's interaction with the first user interface are stored on a dedicated server separate to the first user interface itself. When a first user interface is interacted with, a mapping is made to the dedicated machine to invoke the components remotely. This allows different servers to monitor user interaction with their associated interfaces without duplication of components. Thus it is possible to monitor both first user interface interaction and different user interface interaction using the same monitoring components. The information itself may also be stored at the dedicated machine, in which case this information is further categorised by server.

According to yet another aspect, the invention provides a server for servicing users with web pages, comprising: means for receiving a request from a user for a web page of a first type (A); means for identifying that said user has had trouble using at least a part of a website with which said first type of web page is associated; and means for servicing said user with a web page of a second type (B).

In one embodiment of the present web pages of a second type are stored separately from web pages of a first type. Storing both first and second type web pages on the same server has the advantage that the same components can be used to monitor the user's interaction with the web pages of the second type. Further there is no additional communication across the network required and thus the inherent delays associated therewith are avoided.

According to yet another aspect, the invention provides an application program having a first user interface, said application program comprising: program code for identifying from a plurality interactions by a user with said first user interface whether they experienced difficulties using said first user interface; and at least one alternative user interface, at least one module of said at least one alternative user interface being selectable in response to a determination that said user did experience difficulties using said first user interface.

It will therefore be appreciated that the invention is generally applicable to user interfaces. This includes web based interaction as well as interaction with an application having a user interface. The application may be distributed on a medium such as CD-ROM or be server based.

According to yet another aspect, the invention provides a server for analysing a user's interactions with a first user interface provided by a remote server comprising: means for analysing information regarding a user's interactions with said first user to determine whether said user has experienced difficulties with said first user interface; means, responsive to determining that said user has experienced difficulties, for instructing said remote server to provide said user with at least one module of a different user interface.

Keeping the analysis components separate from the server providing the user interface means that these components can monitor user interactions with numerous different user interfaces without duplication of the components.

In one embodiment, the remote server does not provide the at least one module of the different interface itself, but instructs another server to do so.

The recording of positional user interaction information is particularly advantageous since from this information it is possible to determine that a user or particular category of users is/are having trouble using a user interface. This information is used to direct all such users to an alternative but appropriate user interface and this is preferably done transparently. Whether the diversion occurs within the middle of a session (i.e. at the next request) or when the user returns at another time, the user is not aware that they are seeing a user interface different from that shown to another set of users. This transparent diversion means that the user does not feel at all discriminated against. This may be especially important with disabled users who wish to be treated "normally" and do not want to have their disability highlighted.

BRIEF DESCRIPTION OF THE DRAWINGS

A preferred embodiment of the present invention will now be described, by way of example only, and with reference to the following drawings:

FIG. 3 shows some example source html for the web page of FIG. 2 in accordance with a preferred embodiment of the present invention;

DESCRIPTION OF THE PREFERRED EMBODIMENTS

Figure 1:
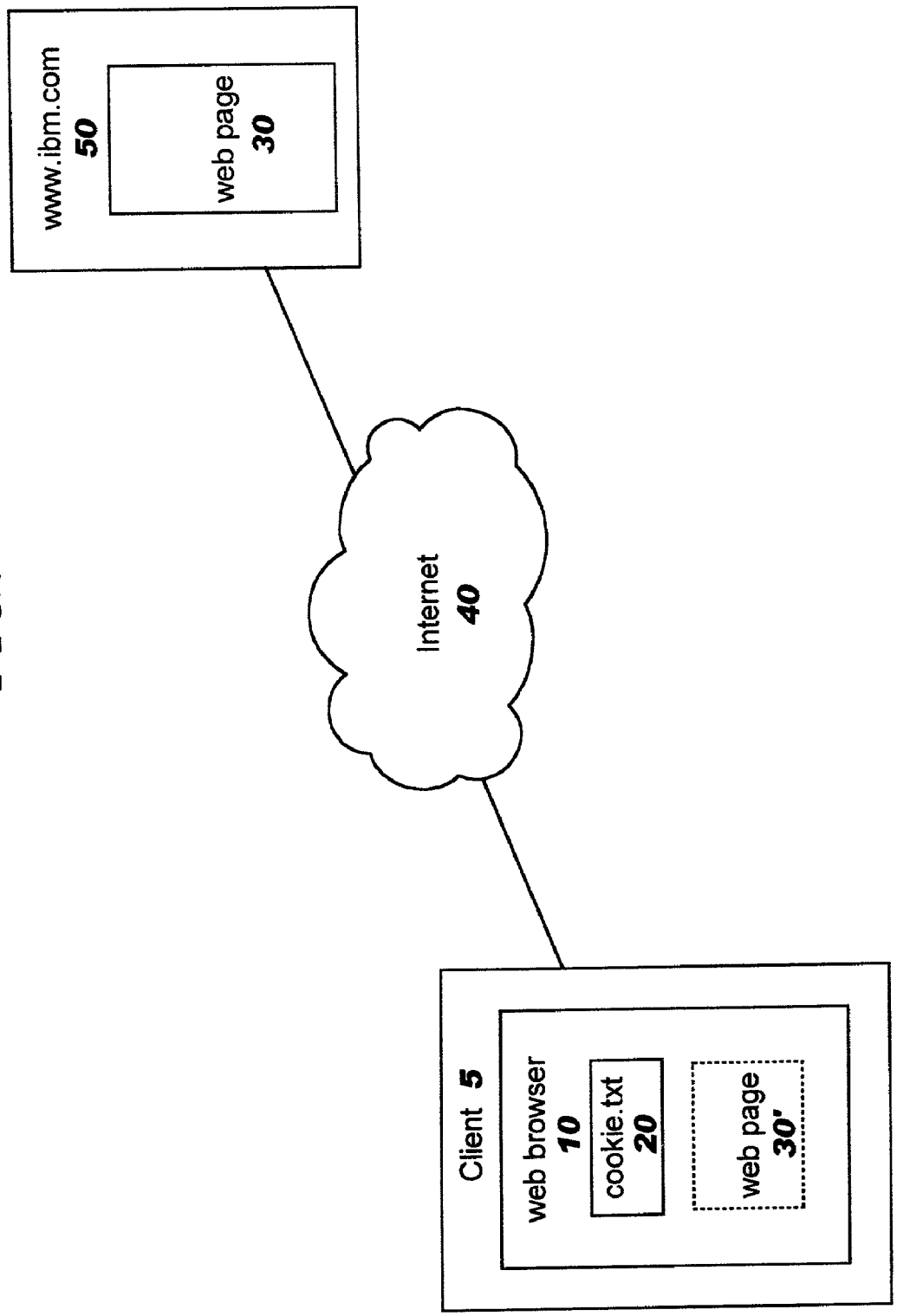
FIG. 1 shows a browser viewing pages stored at a web server in accordance with the prior art.

With reference to FIG. 1, a web browser 10 running on a client 5 connects to a web server "www.ibm.com" 50 via the Internet 30. In accordance with the preferred embodiment, the web browser is Microsoft's Internet Explorer, but it will be appreciated that the invention is not limited to such. Web browser 10 requests web page 30 and this is downloaded and displayed therein 30'. A file 20 (cookie.txt) is either created (if this is the client's first visit to this particular web server) or is transmitted to the web server and used thereat to identify the connecting computer and to personalise the web page 30' displayed in the web browser 10.

Figure 2:
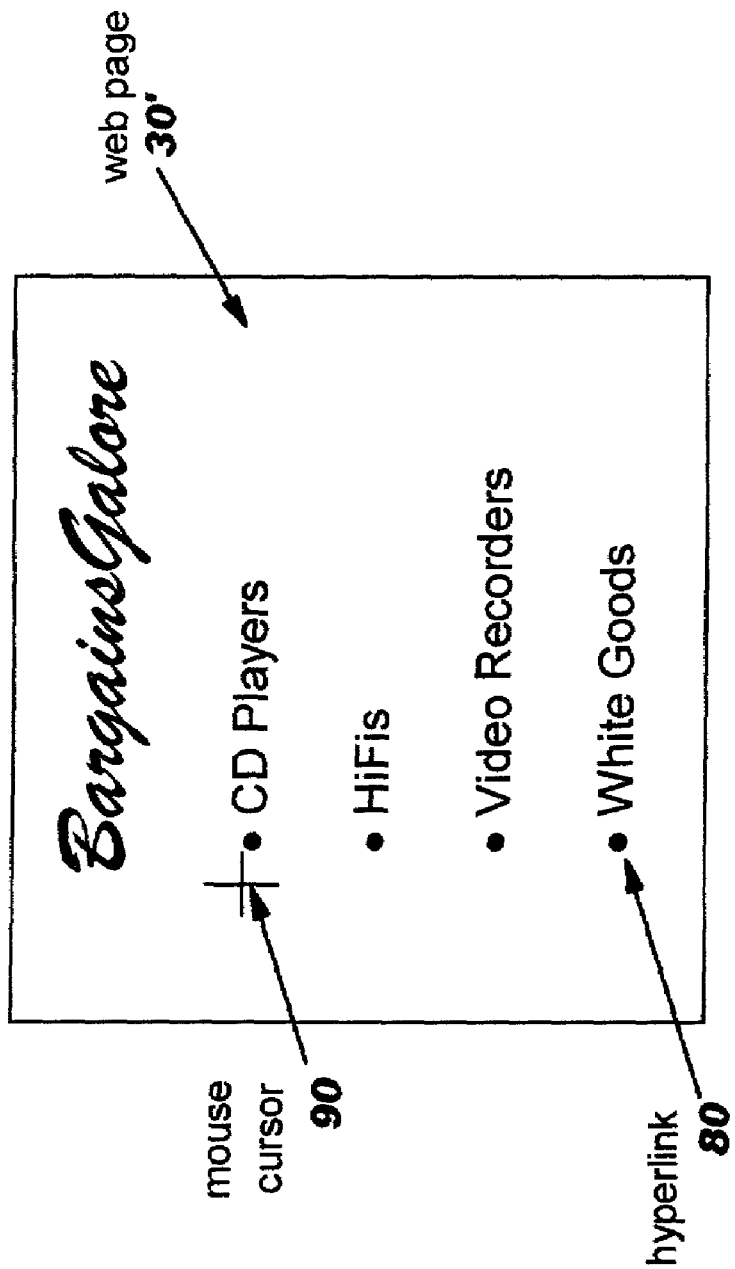
FIG. 2 illustrates an example web page in accordance with a preferred embodiment of the present invention.

FIG. 2 shows an example web page 30' in accordance with a preferred embodiment of the present invention. The web page is stored at web server 50 and depicts a number of hyperlinks 80 (selectable elements) with non-selectable text besides each one (e.g. White Goods). In this instance, it can be seen that the hyperlinks are relatively small and overshadowed by that text. Perhaps for this reason, a user (not shown) is having difficulty placing the centre of a mouse cursor 90 on the link beside the text CD Player.

FIG. 3 shows some example source html for the web page of FIG. 2 in accordance with a preferred embodiment of the present invention. (It will be appreciated that some but not all of the source for page 30 is present.) It can be seen that the page is embedded with javascript and contains the function handleEvent( ). This function is shown as handling [code], the purpose of which will be explained below.

Within the body of the html source is a function onmousedown=HandleEvent( ). Every time the user clicks a mouse button to perform (or attempt to perform) a selection, this function calls the HandleEvent function. The handleEvent function constructs a URL of the form "www.ibm.com/cgi-bin/logclicks?x=37, y=54" and issues an HTTP GET to the server addressed by that URL (i.e. "www.ibm.com").

The URL then invokes a Common-Gateway Interface (CGI) script or servlet program, logclicks 100 (see FIG. 4), running on the web server 50. The script 100 is passed as arguments to the URL x and y values which represent coordinate values denoting the position that the user clicked on the web page. It will be appreciated that these will vary with each click.

An HTTP GET typically requests and therefore returns a web page to the requesting client. In this instance there is nothing to display. The command was issued only in order to pass the click coordinates to the logclicks CGI program. Therefore defined within the requesting web page 30' is a hidden frame (not shown(!)). In other words, this frame is of zero height and width. The logclicks program returns a page to this hidden frame. This means that the user does not see any change to the web page 30' and the positional coordinates have been transmitted to the web server 50.

Figure 4:
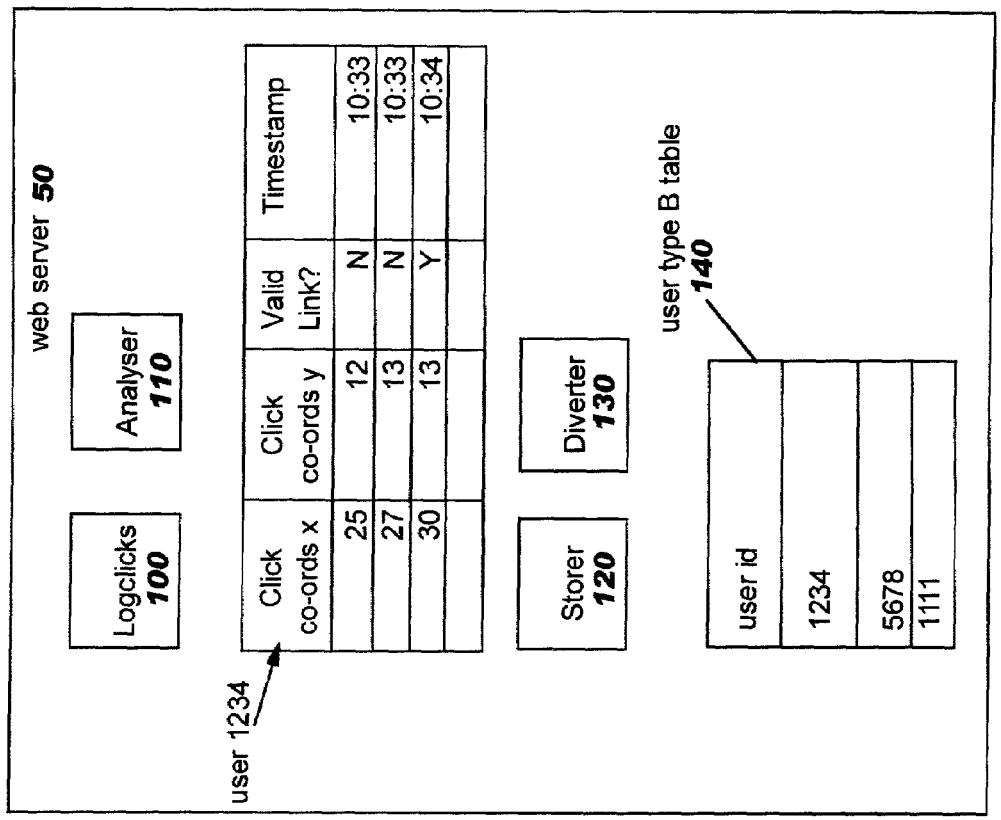
FIG. 4 shows components stored at the web server in accordance with a preferred embodiment of the present invention.
Figure 5:
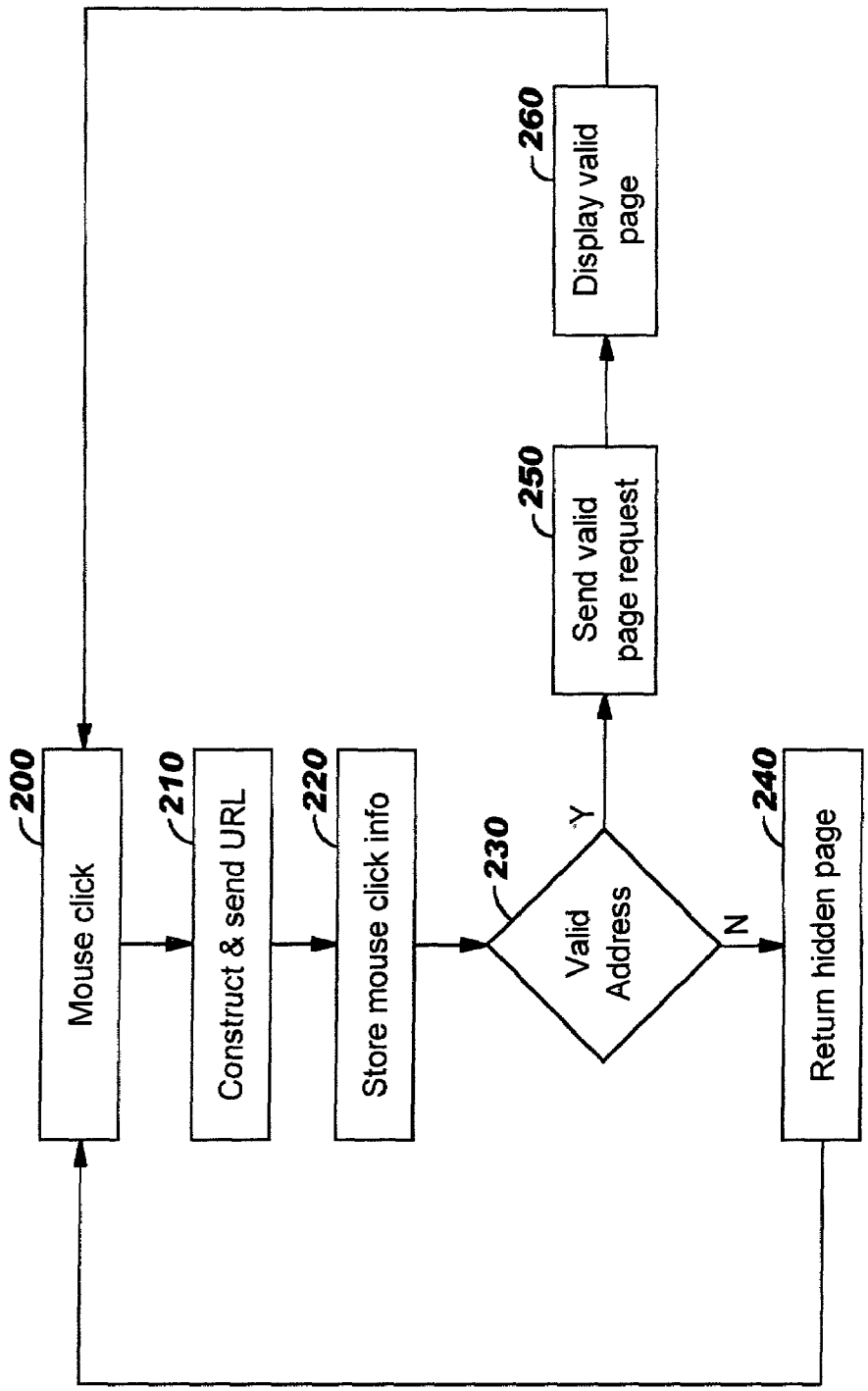
FIG. 5 illustrates the process for obtaining and storing mouse click information in accordance with a preferred embodiment of the present invention.

FIG. 4 shows components stored at the web server in accordance with a preferred embodiment. It should be read in conjunction with FIGS. 5, 6 and 7 which illustrate how these components interact and process information.

Web server 50 stores a logclicks component 100; an analyser component 110; a storer 120 and a diverter 130. When a user performs a mouse click on web page 30' (step 200) a URL is constructed as described with reference to FIG. 4. This is transmitted to web server 50 (step 210) and invokes the logclicks component 100. Every time a page is requested from the server by a returning user, the file cookie.txt 20 is transmitted to the server to identify the user (for a first-time user (or visitor) the file is created). Each user has information stored at the web server in tabular form (this will need to be created for a first-time visitor). The figure depicts the information stored for user 1234. In the preferred embodiment, the logclicks component stores the x and y coordinate values received from web browser 10 in this table. It also stores a click timestamp (step 220). Whilst the timestamp is depicted as showing hours and minutes, it may be more appropriate to record the time down to the nearest second or even hundredth of a second since a user will typically make a quick succession of mouse clicks.

At step 230 it is determined whether the initial mouse click selection was for a valid link or other selectable UI element. If it wasn't (i.e. a hyperlink was missed) then a hidden page is returned at step 240 (as described above). The appropriate table entry is modified to indicate that the particular click selection was not for a valid link (N). If the click did select a valid link, then a subsequent HTTP GET request is issued (step 250) and the page is downloaded to the client's web browser (step 260). For a link linking to the same website the HTTP GET is issued back to the same web server 50. This request is therefore seen at that web server and is used to determine that a valid link was followed. The appropriate table entry is this time modified to indicate that a valid link was requested (Y). If the link links to another website located at a different web server (external link) then an event is not typically seen back at server 50. To cater for this situation and in accordance with the preferred embodiment, each web page 30 at the web server contains some additional javascript (not shown). There is an onmouseclick event attached to each external link which when that link is selected invokes a logginglink( ) function. This constructs a URL of the form "www.ibm.com/cgi-bin/validlink?vlink=47". This URL is transmitted to web server 50 and invokes a CGI program validlink (not shown) thereat. By way of example, the vlink parameter 47 is passed to this program and denotes the link that was followed. This is preferably correlated with a web page map in order to determine which button or hyperlink was selected. The map is also used for the hyperlinks which request web pages from the same server. Preferably the web page map includes references to any of the hyperlinks; text; and images present on the associated page. This is used to determine whether a user's selection constitutes a hit or a miss and if a miss, which link the user was aiming for (i.e. clicked in the vicinity of). This enables more accurate information to be provided. For example, it is possible for analyser 110 to determine that a user continually clicked on a non-selectable piece of text positioned close to a hyperlink before actually hitting the link itself. It will be appreciated that the coordinates may vary between one browser and the next and between one browser and the web server. This is because the coordinates are typically dependent upon the shape and size of the window in which a browser and consequently the web page is displayed. This does not matter however, because it is possible to deduce from the action performed that a link was selected. By correlating the click coordinates for selectable elements with the click coordinates for non-selectable elements immediately previous, one can tell which link was being aimed for and where relative to the final valid selection the non-selectable clicks were made. If for example the map shows that a hyperlink has non-selectable text immediately to the left of it and the non-selectable clicks were made immediately to the left of the final selection then it is possible to make the assumption that the text is misleading to that user.

Figure 8:
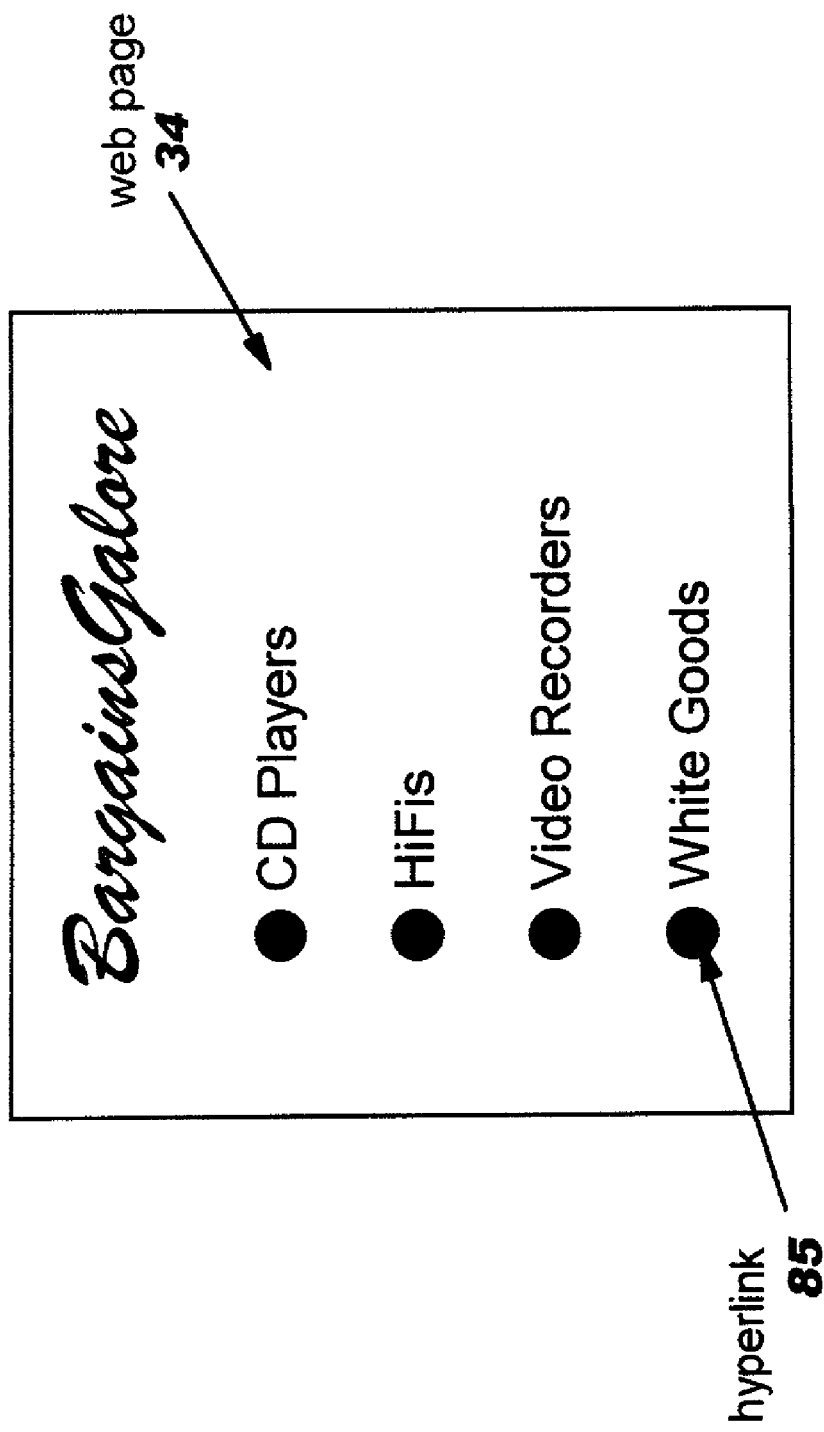
FIG. 8 shows an example web page of type B in accordance with a preferred embodiment of the present invention.

All the analysis information gathered by analyser 110 is preferably used to design new websites including web pages such as the one depicted in FIG. 8. The new sites are aimed at different categories of user (there can be more than one table (or more than one column) categorising users at web server 50.

Figure 6:
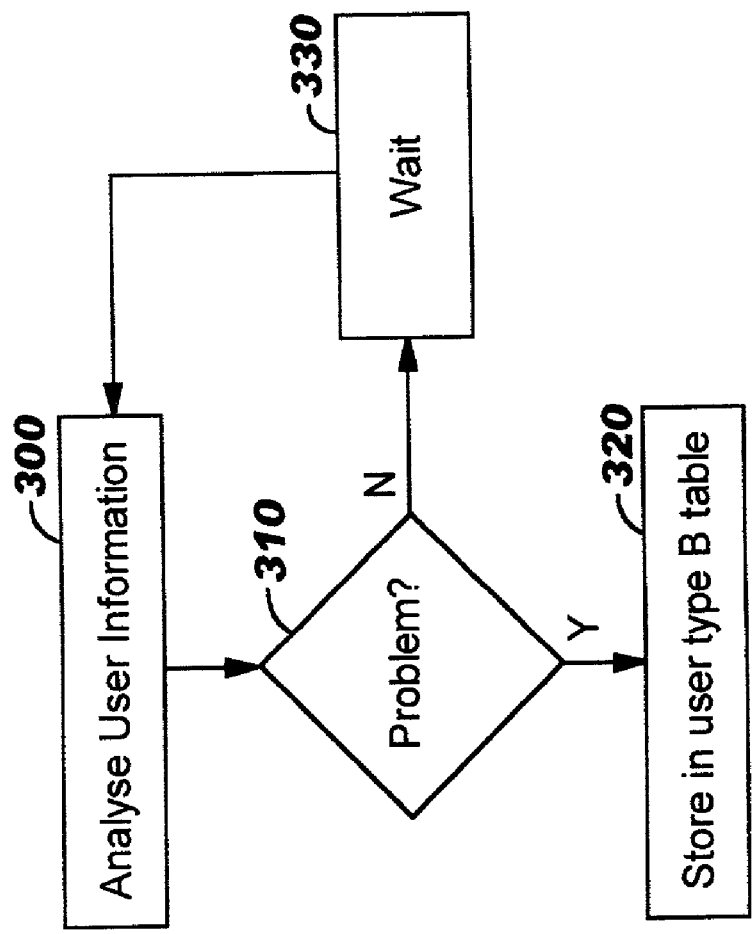
FIG. 6 shows the stored results obtained by way of the process of FIG. 5 being analysed in accordance with a preferred embodiment of the present invention.

The other components shown in FIG. 4 will now be described with reference to FIGS. 6 and 7. FIG. 6 shows how the results stored within each user's table (e.g. user 1234) are periodically analysed. At step 300 the information is analysed to determine whether or not a particular user is having trouble using the web site (step 310). The stored map is preferably also used.

A problem is in this embodiment identified when a particular user has made a predetermined number (e.g. 2) of clicks on non-selectable in the vicinity of a particular link (or screen area) just before making a valid selection. In one embodiment the conclusion that a user is having difficulties is only reached after a user has had a number of misses in relation to a number of different hyperlinks or a number of misses and then hits in relation to a particular hyperlink but over specific timeframes. The latter indicates that a single area of a web page is inappropriately designed for some users.

From the table 1234 in conjunction with the stored it can be determined that different users are experiencing different problems. For example, that some users are having difficulty with the colour of links (e.g. they are continually clicking on a non-selectable image because the selectable text nearby is in a colour which is difficult for them to identify.) During the analysis process users can be categorised according to the difficulty that they are experiencing and can be provided with a web page or user interface according to that difficulty.

In accordance with one embodiment of the present invention, if a problem is identified, a user identifier (ID) or system identifier is stored in table 140 at step 320 using storer component 120. Alternatively an indicator can be stored in the file cookie.txt referencing that the user has difficulty using pages from the website. In another embodiment, a pointer to table 140 is stored in cookie.txt. The information in table 1234 can then be erased. If no problem is identified the process waits a predetermined amount of time (step 330) before reanalysing the stored information.

Figure 7:
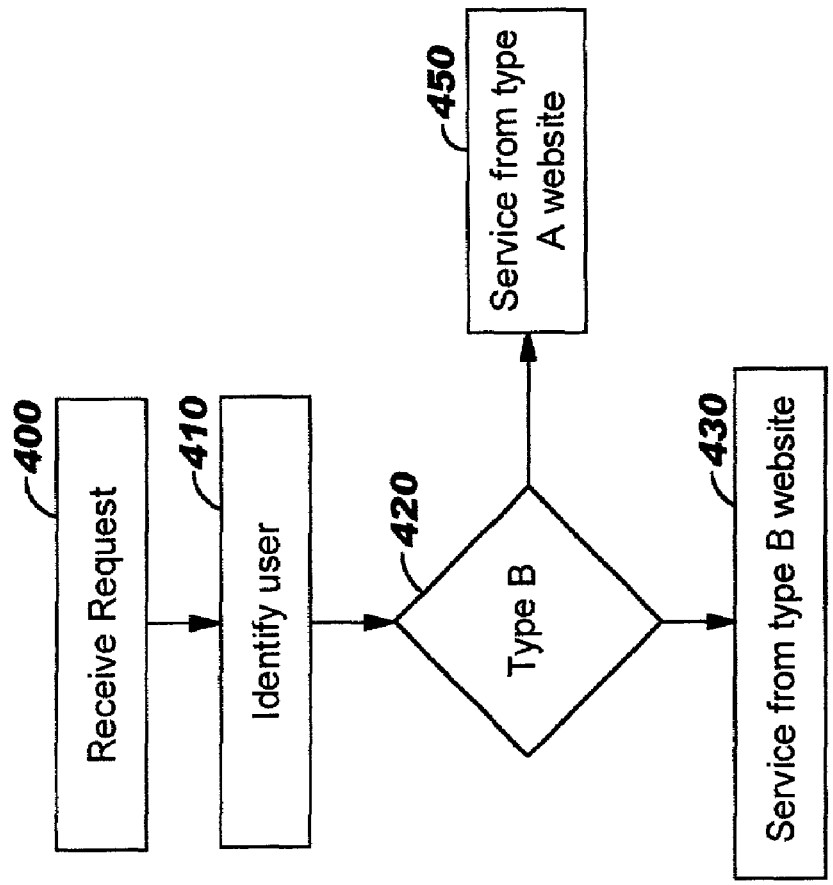
FIG. 7 shows the process of receiving web page requests in accordance with a preferred embodiment of the present invention.

FIG. 7 shows the process of receiving web page requests in accordance with a preferred embodiment of the present invention. Subsequent requests for a web page(s) received (step 400) by the same user are identified using the cookie 20 transmitted at the same time (step 410). In one embodiment each time a request is received a check is made to determine whether the user ID of a user issuing a request exists in table 140 prior to servicing the request. In an alternative embodiment, this information is instead recorded in the cookie.txt such that the web server 50 will automatically redirect web page requests and service appropriate users with type B web pages. In yet another embodiment, the cookie provides a reference to table 140 on the web server (step 420).

In one embodiment a check is only made when the user is a returning user (i.e. not within the same user session). In another embodiment, this is done each time a new request comes in (this could well be within the same user session).

If the user's ID cannot be found in the table or it is otherwise identified that the user has not been labelled as one previously having trouble with the web site or page in question, then the user is serviced with pages from type A website (step 450). In other words the user continues to receive their web pages from the same site as before. There is no change since the site is not causing the user any difficulties.

If on the other hand, the user's ID does exist within table 140 or it is otherwise identified that the user did previously have trouble, then the user is serviced with pages from a type B web site. The diverter component 130 diverts the HTTP GET request to another appropriately designed web site. Note, the alternative type B website may be stored at the same web server 50 or at an entirely separate web server. Storing both websites on the same server has the advantage that the same components can be used to monitor the user's interaction with the type 8 site. Further there is no additional communication across the network required and thus the inherent delays associated therewith are avoided.

However, in one embodiment the components stored at web server 50 are instead stored on a dedicated machine separate from the type A website. When a web page request is received at the servicing web server, a mapping is made to the dedicated machine to invoke the components remotely. This allows different web servers to monitor user interaction with their associated sites without duplication of components. Thus it is possible to monitor both type A web site user interaction and type B user interaction using the same monitoring components. The mouse click information may also be stored at the dedicated machine, in which case this information is further categorised by web server.

FIG. 8 shows an example web page of type B in accordance with a preferred embodiment of the present invention. It can be seen that the hyperlinks 85 (or selectable elements) of web page 34 have been substantially enlarged, but that otherwise the website is essentially the same as 30. It should be noted that this design is by way of example only and that many different website designs are possible and will typically take into account considerations such as the position and size of hyperlinks including how they are positioned on the HTML page relative to other visual cues, buttons and other hyperlinks. Further the colour and applicability of the links are also preferably important (e.g. a telephone is an intuitively good icon (pointer) for lining to contact information). The web page map preferably includes all such information and is used for this purpose. Further the invention is not limited to only two types of user categorisation.

It will be appreciated that the invention is not limited to the embodiments described above and that they are by way of example only. It should be further noted that with form input buttons of type "image", the handleEvent function preferably does not need to contain code for extracting the x and y coordinates of the mouse click position. Such buttons are very often used to provide a visually appealing alternative to the regular grey "submit" button of standard html. The regular grey submit button is generated by the following html:

```
<form>
<input type="submit" name="button_name"
value="button_value">
</form>
```

This sends a form entry (name/value pair) of "button_name=button_value" to the receiving program, along with all the other name/value fields from the form, to enable a programmer to work out which of potentially several submit buttons was clicked.

The more visually appealing alternative is typically generated by:

```
<form>
<input           type="image"          src="picture.gif"
   name="button_name">
</form>
```

This displays picture.gif. and makes it selectable (or clickable). When the user selects it, the form contents are sent to the URL specified in the <form> tag, essentially in the same way as with the regular grey submit button. With the input button of type "image", when the form is submitted by clicking on the image, two additional name/value pairs are also added on to the form content:

button_name.x=12 button_name.y=34

These indicate not only that the button was clicked but also, the x, y coordinate position values of where on the image the user clicked. Of course the values 12 and 34 above are by way of example only and will vary dependent upon click position. By logging these x, y coordinates on a per-image basis, and also by user, a picture can be built up over time of the average and variance of where people click on the images. The use of such information is most helpful with regard to near misses. However, in one embodiment each image is built with a transparent buffer zone such that actual misses can also be recorded in this way.

It will therefore be appreciated that there are numerous different ways of recording click information and that the invention is not limited to any one particular embodiment.

The recording of positional mouse click information is particularly advantageous since it allows the analyser component to determine that a user or particular category of users is/are having trouble using a site. This information is used to direct all such users to an alternative site and this is done transparently. Whether the diversion (by the diverter component) occurs within the middle of a session (i.e. at the next request) or when the user returns at another time, the user is not aware that they are seeing a site different from that shown to another set of users. This transparent diversion means that the user does not feel at all discriminated against. This may be especially important with disabled users who wish to be treated "normally" and do not want to have their disability highlighted.

Whilst the invention has been described in terms of diversion to previously created websites, it is not limited to such. In another embodiment, the analyser component transmits the information it gathers to a web page creating component (not shown) which creates a new web page dynamically upon each subsequent request by the same user.

What is claimed is:

1. A method for providing to a user a user interface comprising the steps of:
   determining from a plurality interactions by a user with a first user interface whether they experienced difficulties using at least one module of said first user interface;
   and responsive to determining that said user did experience difficulties, providing said user with at least one module of a different user interface, wherein the first user interface has at least one selectable element, the determining step comprising:
   analyzing user interactions in relation to selectable elements, wherein the step of analyzing user interactions comprises:
   noting when a user has selected a selectable element (a hit); and
   noting when a user has selected a non-selectable element (a miss), wherein the step of noting when a user has selected a selectable and a non-selectable element comprises:
   receiving information regarding the position within said first user interface of each hit and each miss.

2. The method of claim 1, wherein each user interface is a component of at least one web page and wherein said method comprises the steps of:
   determining from a plurality of interactions by a user with at least one web page of a first type whether they experienced difficulties using the at least one web page of a first type; and
   responsive to determining that said user did experience difficulties, servicing said user with at least one web page of a second type.

3. The method of claim 1, wherein the first user interface is part of an application program, said application program comprising:
   program code for identifying said interaction difficulties; and
   selectable user interfaces.

4. The method of claim 1, wherein the method further comprises the step of:
   storing information regarding user interactions with said first user interface.

5. The method of claim 4, wherein the step of determining from a plurality interactions by a user with a first user interface whether they experienced difficulties using at least one module of said first user interface comprises:
   analysing said stored set of previous interactions by said user with said first user interface.

6. The method of claim 1, wherein the step of determining from a plurality interactions by a user with a first user interface whether they experienced difficulties using at least one module of said first user interface comprises:
   receiving a message indicating that said user had previously experienced difficulties.

7. A method for providing to a user a user interface comprising the steps of:
   determining from a plurality interactions by a user with a first user interface whether they experienced difficulties using at least one module of said first user interface;
   and responsive to determining that said user did experience difficulties, providing said user with at least one module of a different user interface, wherein the first user interface has at least one selectable element, the determining step comprising:
   analysing user interactions in relation to selectable elements;
   storing a map of the first user-interface, said map providing comprehensive information regarding the layout of said first user interface, said map including details of said first user interface, said map including details of any selectable elements and any non-selectable visual elements.

8. The method of claim 7 comprising the steps of:
   using said map to determine which visual non-selectable element was selected relative to a nearby selectable element; and
   responsive to determining that said visual non-selectable element is repeatedly selected prior to the selection of said nearby selectable element further determining that the positioning of visual non-selectable element is misleading to that user.

9. A method for servicing users with web pages, comprising the steps of:
   receiving a request from a user for a web page of a first type;
   identifying that said user has had trouble using at least a part of a website with which said first type of web page is associated;

servicing said user with a web page of a second type, wherein a user selection of a hyperlink invokes a web page request;
receiving first positional information regarding a user selection;
receiving second positional information regarding at least one selection in a web page of a non-selectable element;
storing said first and second positional information;
associating said positional information with a user identifier;
storing timestamps relating to said first and second positional information; and
periodically correlating said requesting user second positional information indicating a selection by said user in the vicinity of a hyperlink, with said user's first positional information that resulted in the selection of that hyperlink.

10. The method of claim 9, wherein second positional information is only correlated with first positional information if the timestamps for each are within a predetermined range.

11. The method of claim 9, comprising the steps of:
using said correlated first and second positional information to determine whether a user is having trouble using at least a part of the website with which said first type of web page is associated; and if so making a note of said user's identifier.

12. The method of claim 9, comprising the step of:
storing a map of the web page from which said hyperlink is selected, said map providing comprehensive information regarding the layout of said web page, said map including details of any hyperlinks and at least one of non-selectable text; non-selectable images; and colours.

13. The method of claim 9, comprising the step of:
grouping users according to the trouble they experience using said website; and wherein the servicing step comprises:
servicing a user with a web page according to the group within which that user sits.

14. The method of claim 9, wherein said positional information comprises x and y coordinate values.

15. The method of claim 9, wherein the identifying step comprises:
accessing a list denoting those users who have had trouble using at least part of the website with which said first type of web page is associated; and
determining whether the user requesting the first type of web page is found within said list; and wherein the servicing step is responsive to determining that the user is within said list.

16. The method of claim 9, wherein web pages of a second type are stored separately from web pages of a first type.

17. A method for servicing users with web pages, comprising the steps of:
receiving a request from a user for a web page of a first type;
identifying that said user has had trouble using at least a part of a website with which said first type of web page is associated;
servicing said user with a web page of a second type, wherein a user selection of a hyperlink invokes a web page request;
receiving first positional information regarding a user selection;
receiving second positional information regarding at least one selection in a web page of a non-selectable element;
storing a map of the web page from which said hyperlink is selected, said map providing comprehensive information regarding the layout of said web page, said map including details of any hyperlinks and at least one of non-selectable text; non-selectable images; and colours;
using said map to determine which non-selectable element of the mapped web page was selected relative to a hyperlink in the vicinity of said non-selectable element; and
responsive to determining that said non-selectable element is repeatedly selected prior to the selection of a hyperlink and that said non-selectable element is at least one of text and an image, further determining that the positioning of said text and/or image is misleading to that user.

18. The method of claim 17, comprising the step of:
using at least one of said positional information and said map to create at least one new web page for servicing, upon request, users identified as having trouble using said web page of a first type.

19. A method for servicing users with web pages, comprising the steps of:
receiving a request from a user for a web page of a first type;
identifying that said user has had trouble using at least a part of a web site with which said first type of web page is associated; and
servicing said user with a web page of a second type, wherein the identifying step comprises:
accessing a list denoting those users who have had trouble using at least part of the website with which said first type of web page is associated; and
determining whether the user requesting the first type of web page is found within said list; and wherein the servicing step is responsive to determining that the user is within said list, wherein the receiving step comprises:
receiving a message including an indicator pointing to said list, and wherein the identifying step comprises:
using the indicator within said message to reference said list.

20. A method for servicing users with web pages, comprising the steps of:
receiving a request from a user for a web page of a first type;
identifying that said user has had trouble using at least a part of a website with which said first type of web page is associated; and
servicing said user with a web page of a second type, wherein the receiving step comprises:
receiving a message including an indicator that said requesting user previously had trouble using at least a part of the website with which said first type of web page is associated; and wherein the identifying step comprises:
using the indicator within said message, the servicing step being responsive to the presence of said indicator.

21. A server for providing to a user a user interface, comprising:
means for determining from a plurality interactions by a user with a first user interface whether they experienced difficulties using at least one module of said first user interface; and means, responsive to determining that said user did experience difficulties, for providing said user with at least one module of a different user interface, wherein the first user interface has at least one selectable element, the determining means comprising:
  means for analysing user interactions in relation to selectable elements, wherein the means for analysing user interactions comprises:
    means for noting when a user has selected a selectable element (a hit); and
    means for noting when a user has selected a non-selectable element (a miss), wherein the means for noting when a user has selected a selectable and a non-selectable element comprises:
      means for receiving information regarding the position within said first user interface of each hit and each miss.

22. The server of claim 21, wherein each user interface is a component of at least one web page and wherein said server comprises:
  means for determining from a plurality of interactions by a user with at least one web page of a first type whether they experienced difficulties using the at least one web page of a first type; and
  means, responsive to determining that said user did experience difficulties, for servicing said user with at least one web page of a second type.

23. The server of claim 21, wherein the first user interface is part of an application program, said application program comprising:
  program code for identifying said interaction difficulties; and
  selectable user interfaces.

24. The server of claim 21, further comprising:
  means for storing information regarding user interactions with said first user interface.

25. The server of claim 24, wherein the means for determining from a plurality interactions by a user with a first user interface whether they experienced difficulties using at least one module of said first user interface comprises:
  means for analysing said stored set of previous interactions by said user with said first user interface.

26. The server of claim 21, wherein the means for determining from a plurality interactions by a user with a first user interface whether they experienced difficulties using at least one module of said first user interface comprises:
  means for receiving a message indicating that said user had previously experienced difficulties.

27. A server for providing to a user a user interface, comprising:
  means for determining from a plurality interactions by a user with a first user interface whether they experienced difficulties using at least one module of said first user interface; and
  means, responsive to determining that said user did experience difficulties, for providing said user with at least one module of a different user interface, wherein the first user interface has at least one selectable element, the determining means comprising:
    means for analysing user interactions in relation to selectable elements;
    means for storing a map of the first user-interface, said map providing comprehensive information regarding the layout of said first user interface, said map including details of any selectable elements and any non-selectable visual elements.

28. The server of claim 27 comprising:
  means for using said map to determine which visual non-selectable element was selected relative to a nearby selectable element; and
  means, responsive to determining that said visual non-selectable element is repeatedly selected prior to the selection of said nearby selectable element, for further determining that the positioning of visual non-selectable element is misleading to that user.

29. A server for servicing users with web pages, comprising:
  means for receiving a request from a user for a web page of a first type;
  means for identifying that said user has had trouble using at least a part of a website with which said first type of web page is associated;
  means for servicing said user with a web page of a second type, wherein a user selection of a hyperlink invokes a web page request;
  means for receiving first positional information regarding a user selection;
  means for receiving second positional information regarding at least one selection in a web page of a non-selectable element;
  means for storing said first and second positional information;
  means for associating said positional information with a user identifier;
  means for storing timestamps relating to said first and second positional information; and
  means for periodically correlating said requesting user second positional information indicating a selection by said user in the vicinity of a hyperlink, with said user's first positional information that resulted in the selection of that hyperlink.

30. The server of claim 29, wherein second positional information is only correlated with first positional information if the timestamps for each are within a predetermined range.

31. The server of claim 29, comprising:
  means for using said correlated first and second positional information to determine whether a user is having trouble using at least a part of the website with which said first type of web page is associated; and
  means, responsive to determining that said user is having trouble, for making a note of said user's identifier.

32. The server of claim 29, comprising:
  means for storing a map of the web page from which said hyperlink is selected, said map providing comprehensive information regarding the layout of said web page, any hyperlinks and at least one of non-selectable text; non-selectable images; and colours.

33. The server of claim 29, comprising:
  means for grouping users according to the trouble they experience using said website; and wherein the servicing means comprises:
  means for servicing a user with a web page according to the group within which that user sits.

34. The server of claim 29, wherein the identifying step comprises:
  means for accessing a list denoting those users who have had trouble using at least part of the website with which said first type of web page is associated; and
  means for determining whether the user requesting the first type of web page is found within said list; and wherein the servicing step is responsive to determining that the user is within said list.

35. The server of claim 29, wherein web pages of a second type are stored separately from web pages of a first type.

36. A server for servicing users with web pages, comprising:
- means for receiving a request from a user for a web page of a first type;
- means for identifying that said user has had trouble using at least a part of a website with which said first type of web page is associated;
- means for servicing said user with a web page of a second type, wherein a user selection of a hyperlink invokes a web page request;
- means for receiving first positional information regarding a user selection;
- means for receiving second positional information regarding at least one selection in a web page of a non-selectable element;
- means for storing a map of the web page from which said hyperlink is select ed, said map providing comprehensive information regarding the layout of said web page, any hyperlinks and at least one of non-selectable text; non-selectable images; and colours;
- means for using said map to determine which non-selectable element of the mapped web page was selected relative to a hyperlink in the vicinity of said non-selectable element; and
- means, responsive to determining that said non-selectable element is repeatedly selected prior to the selection of a hyperlink and that said non-selectable element is at least one of text and an image, for further determining that the positioning of said text and/or image is misleading to that user.

37. The server of claim 36, comprising:
- means for using at lest one of said positional information and said map to create at least one new web page for servicing, upon request, users identified as having trouble using said web page of a first type.

38. A server for servicing users with web pages, comprising:
- means for receiving a request from a user for a web page of a first type;
- means for identifying that said user has had trouble using at least a part of a website with which said first type of web page is associated; and
- means for servicing said user with a web page of a second type, wherein the identifying means comprises:
- means for accessing a list denoting those users who have had trouble using at least part of the website with which said first type of web page is associated; and means for determining whether the user requesting the first type of web page is found within said list; and wherein the servicing means is responsive to determining that the user is within said list, wherein the receiving means comprises:
- means for receiving a message including an indicator pointing to said list, and wherein the identifying means comprises:
- means for using the indicator within said message to reference said list.

39. A server for servicing users with web pages, comprising:
- means for receiving a request from a user for a web page of a first type;
- means for identifying that said user has had trouble using at least a part of a website with which said first type of web page is associated; and means for servicing said user with a web page of a second type, wherein the receiving means comprises:
- means for receiving a message including an indicator that said requesting user previously had trouble using at least a part of the website with which said first type of web page is associated; and wherein the identifying means comprises:
- means for using the indicator within said message, the servicing means being responsive to the presence of said indicator.

40. A computer program product comprising computer program code adapted to perform the method of claim 1 when said program is run on a computer.

41. A computer program product comprising computer program code adapted to perform the method of claim 9 when said program is run on a computer.

* * * * *